(12) United States Patent
DiStefano, III (10) Patent No.: US 7,353,199 B1
(45) Date of Patent: Apr. 1, 2008

(54) METHOD OF MODERATING EXTERNAL ACCESS TO AN ELECTRONIC DOCUMENT AUTHORING DEVELOPMENT AND DISTRIBUTION SYSTEM

(75) Inventor: Thomas L. DiStefano, III, Boca Raton, FL (US)

(73) Assignee: Perfect Web Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/405,731

(22) Filed: Sep. 24, 1999

Related U.S. Application Data (63) Continuation-in-part of application No. 09/273,991, filed on Mar. 22, 1999, now abandoned.

(51) Int. Cl.
*G06Q 40/00* (2006.01)
(52) U.S. Cl. .............. 705/37; 705/38; 705/36; 705/35; 715/530
(58) Field of Classification Search .............. 705/44, 705/37, 35, 34, 26, 27; 707/513, 530; 345/760; 701/201, 208, 209; 360/12; 715/530
See application file for complete search history.

(56) References Cited

U.S. PATENT DOCUMENTS

| | | | |
|---|---|---|---|
| 5,432,934 A * | 7/1995 | Levin et al. ............. | 713/200 |
| 5,615,277 A * | 3/1997 | Hoffman ............. | 382/115 |
| 5,649,186 A | 7/1997 | Ferguson | |
| 5,724,595 A | 3/1998 | Genter | |
| 5,727,156 A | 3/1998 | Herr-Hoyman et al. | |
| 5,758,327 A * | 5/1998 | Gardner et al. ............. | 705/26 |
| 5,793,966 A * | 8/1998 | Amstein et al. ............. | 709/203 |
| 5,860,073 A | 1/1999 | Ferrel et al. | |
| 5,870,552 A | 2/1999 | Dozier et al. | |
| 5,933,498 A * | 8/1999 | Schneck et al. ............. | 705/54 |
| 5,948,040 A * | 9/1999 | DeLorme et al. ............. | 701/201 |
| 5,949,876 A * | 9/1999 | Ginter et al. ............. | 705/80 |
| 6,065,026 A * | 5/2000 | Cornelia et al. ............. | 707/511 |
| 6,170,016 B1 * | 1/2001 | Nakai et al. ............. | 709/232 |
| 6,308,188 B1 * | 10/2001 | Bernardo et al. ............. | 715/530 |
| 6,314,409 B2 * | 11/2001 | Schneck et al. ............. | 380/259 |

(Continued)

OTHER PUBLICATIONS

Macromedia Adds Apple WebObjects 4 Support to Dreamweaver 2 PR News New York Jan. 6, 1999. p. 1).*

*Primary Examiner*—Frantzt Poinvil
*Assistant Examiner*—Clement Graham
(74) *Attorney, Agent, or Firm*—Steven M. Greenberg, Esq.; Carey Rodriguez Greenberg & Paul LLP (57) ABSTRACT

A method for moderating external access to an electronic document authoring, development and distribution system can comprise the steps of: identifying a third party requesting access to the system; permitting restricted access to the third party; and, eliminating all access restrictions imposed in the permitting step when the third party registers with the system. Thus, the inventive method provides to a third party potential customer access to the electronic document authoring, development and distribution system without risking the abuse of the system by the potential customer. The inventive method can encourage the submission of third party Web assets for use by registered users of the system. Specifically, the inventive method can further comprise the steps of: accepting electronic submissions of Web assets from the third party; storing the accepted Web assets in a Web asset database; and, compensating the third party for subsequent distribution of the Web assets.

20 Claims, 4 Drawing Sheets

U.S. PATENT DOCUMENTS 6,625,581 B1 * 9/2003 Perkowski .................. 705/27
6,816,904 B1 * 11/2004 Ludwig et al. ............. 709/226
6,959,286 B2 * 10/2005 Perkowski .................. 705/27

* cited by examiner

METHOD OF MODERATING EXTERNAL ACCESS TO AN ELECTRONIC DOCUMENT AUTHORING DEVELOPMENT AND DISTRIBUTION SYSTEM

CROSS REFERENCE TO RELATED APPLICATIONS

This application is a continuation-in-part of application Ser. No. 09/273,991 filed Mar. 22, 1999 now abandoned.

STATEMENT REGARDING FEDERALLY SPONSORED RESEARCH OR DEVELOPMENT (Not Applicable)

BACKGROUND OF THE INVENTION

1. Technical Field

This invention relates to the field of electronic document authoring, development and distribution and more particularly to a method for moderating external access to an electronic document authoring, development and distribution system.

2. Description of the Related Art

The World Wide Web [Web] has rapidly become an invaluable tool to individuals and businesses. Not only can an individual or business post information on the Web, but also it can use the Web to transact electronic commerce. Because the public is acutely aware of the Web's business and personal benefits, millions of Web pages are being added to the Web each year.

Typically, a Web page is defined by a document containing HyperText Markup Language [HTML] code. An HTML document suitable for posting on the Internet includes both "content" and "markup." Content is information which describes a Web page's text or other information for display or playback on a computer's monitor, speakers, etc. Markup is information which describes the Web page's behavioral characteristics, such as how the content is displayed and how other information can be accessed via the Web page.

In order to provide Web-based information and services over the Internet, the Web employs "client" computers, "browser" software, and "server" computers. A client computer is a computer used by an individual to connect to the Internet and access Web pages. A browser is a software application, located on a client computer, which requests, via the Internet, a Web page from a server. A server is a computer which stores Web page information, retrieves that information in response to a browser's request, and sends the information, via the Internet, to the client computer. Thus, after a Web page is created, the page must be "posted" to a particular server which "hosts" the page, so that the page can be accessed over the Internet.

In operation, the browser can accept a unique address corresponding to the requested Web page residing on a particular domain on the Internet. A domain is an address identifying a unique portion of the Internet. Each domain address is assigned by a central administrator of Internet domain names which provides, tracks and disseminates to the Internet unique domain names corresponding to each domain. Thus, in order to provide Web pages on a particular domain, a domain name first must be registered with the central administrator of Internet domain names.

The unique address corresponding to the requested Web page includes a reference to the domain in which the requested Web page is stored. The unique address is commonly referred to as a uniform resource locator [URL]. Each URL contains the domain name concatenated with a local address for locating the requested Web page on the chosen domain. After receiving the page, the browser displays the Web page corresponding to the requested URL in a Web browser window on the client computer's monitor.

In consequence of the vast number of Web pages and their corresponding URLs residing on the Internet, locating a particular Web page without knowing the particular URL can prove difficult. Traditionally, persons interacting with the Internet can locate a particular URL by querying a search engine. A search engine, a Web page in of itself residing on the Internet, typically contains a database of Web pages, corresponding URLs, and corresponding keywords related to the content of each Web page. Thus, a person can provide the search engine with a keyword relating to the topic for which the person seeks an appropriate Web page. In response, the search engine can select a corresponding Web page and URL, providing the URL to the requesting person in Web page format.

Though the idea of having one's own Web page is appealing, the average individual has little or no knowledge about how to create a Web page. Particularly, the average individual does not know how to create an HTML document or to post that document to a server. Unless that individual is willing to learn how to create and post their own Web page, that individual is faced with few options. In consequence, the most commonly used method for an individual to post a Web page on the Internet is to employ one of numerous companies to provide, for a fee, Web page development services. After contacting such a company, the individual would meet with one of the company's Web page designers to explain the individual's concept for the Web page. The designer subsequently would create the associated HTML document. After approval by the individual, the designer may provide the service of posting the Web page to a server. However, the server typically is not associated with the page development company. Thus, the individual must separately contract with a Web hosting service associated with the server to host the Web page.

Nevertheless, the Web page creation and posting process is time consuming and expensive, because it requires the individual and the designer to spend a significant amount of time together working on a particular page design. In addition, the process is inefficient because the individual must work separately with a designer and an Web hosting service. Thus, a method for enabling an individual to conveniently design a Web page without requiring that individual to learn HTML or to interact extensively with a Web page designer streamlines the Web page creation and posting process.

Still, potential users of an integrated system for creating and posting Web pages remain cautious. First, third party potential users hesitate to purchase a long term contract for hosting a Web page without first realizing the effectiveness of the integrated system. Third party potential users would prefer to "test-drive" the integrated system prior to paying for the use of the integrated system. Of course, the provider of the integrated system requires assurances that the third party potential user will not abuse the provider's good faith in providing free access to the third party potential user.

Second, potential users require a diverse selection of visual and functional components for inclusion in their Web pages. Presently, users of Web design services are limited to Web designs comprising a limited selection of bitmapped graphics, fonts, background images, etc. One method of increasing the design service provider's catalog of Web page objects is by distributing the Web page components of third party authors. For instance, the provider could accept submissions of third-party authored bitmapped graphics, digitized audio, customized backgrounds, and digitized video. Naturally, the third party author will demand compensation in exchange for permitting the use of the Web page components. Moreover, the third party author will require access to the integrated system in order to upload contributed Web page objects. Conversely, as in the case of the free-trial, the Web design service provider will demand adequate assurances that the third party author will not abuse the access to the integrated system. In consequence, a need exists for a method for moderating external access to an electronic document authoring, development and distribution system.

SUMMARY OF THE INVENTION

A method for moderating external access to an electronic document authoring, development and distribution system in accordance with the inventive arrangement satisfies the long-felt need of the prior art by providing to third parties efficient access to system resources while maintaining appropriate security on the authoring, development and distribution system. Thus, the inventive arrangements provide a method for controlling access to a web document authoring, development and distribution system. The inventive arrangements have advantages over all known web document development and distribution methods, and provide a novel and nonobvious method for limiting access to the resources of a system for creating and posting an HTML document on the Web for the benefit of a registered user.

A method for moderating external access to an electronic document authoring, development and distribution system can comprise the steps of: identifying a third party requesting access to the system; permitting restricted access to the third party; and, eliminating all access restrictions imposed in the permitting step when the third party registers with the system. The inventive method provides to a third party potential customer access to the electronic document authoring, development and distribution system without risking the abuse of the system by the potential customer. Specifically, the permitting step comprises the steps of: first disabling in the system all document saving functionality; second disabling in the system all document copying functionality; third disabling in the system all document downloading functionality; and, permitting access to the system subsequent to the first, second and third disabling steps. Finally, the eliminating step comprises the steps of: accepting payment from the third party; recognizing the third party as a registered user; and, removing access restrictions to the system imposed on the registered third party by the permitting step.

The inventive method can eliminate access restrictions imposed upon a third party's access to the system during the conversion of the third party from a potential customer to a registered user. As part of the eliminating step, the accepting step comprises the steps of: accepting credit card information from the third party; submitting the credit card information to a corresponding credit card authorization system; and, retrieving payment authorization from the authorization system. Moreover, the removing step comprises the steps of: first enabling in the system all document saving functionality; second enabling in the system all document copying functionality; third enabling in the system all document downloading functionality; and, permitting access to the system subsequent to the first, second and third enabling steps.

Additionally, the inventive method can further comprise the steps of: accepting a request from the registered user for a unique URL; registering the unique URL on behalf of the registered user; and, associating the unique URL with a Web site commissioned by the registered user and posted for Internet viewing. Likewise, the inventive method can further comprise the steps of: accepting a request from the registered user to submit a URL associated with a Web site commissioned by the registered user to a plurality of Web search engines; retrieving a list of the Web search engines selected by the registered user; and, submitting the URL to each Web search engine contained in the list.

The inventive method can encourage the submission of third party Web assets for use by registered users of the system. Specifically, the inventive method can further comprise the steps of: accepting electronic submissions of Web assets from the third party; storing the accepted Web assets in a Web asset database; and, compensating the third party for subsequent distribution of the Web assets. The accepting step comprises the steps of: permitting an upload of the Web assets from the third party; screening the uploaded Web assets for marketable content; and, accepting the screened uploaded Web assets for distribution on the system. The compensating step comprises the steps of: for each Web asset used by a registered user in forming a Web page, identifying a third party author corresponding to the Web asset; and, crediting a credit card account of the third party author in compensation for the use by the registered user of the Web asset corresponding to the third party author.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims. The present invention is a method for moderating external access to an electronic document authoring, development and distribution system. The method can be performed on a computer system operably connected to the Internet. In the preferred embodiment, the method can identify a user requesting access to the system. If the user is a potential customer, the method can restrict the potential customer's access to saving and downloading features of the system. Consequently, the potential user can sample the functionality and utility of the system without gaining full access to the system before first paying an access fee for access rights to the system. In contrast, if the user is a third party author of a Web asset for use in a Web page designed by a registered user using the system, the method permits the third party author to upload the author's contribution to the system's Web asset database. Subsequently, if a registered user of the system uses in the creation of a Web page the Web asset uploaded by the third party author, the system can compensate the third party author for the use of the Web asset contribution.

Figure 1:
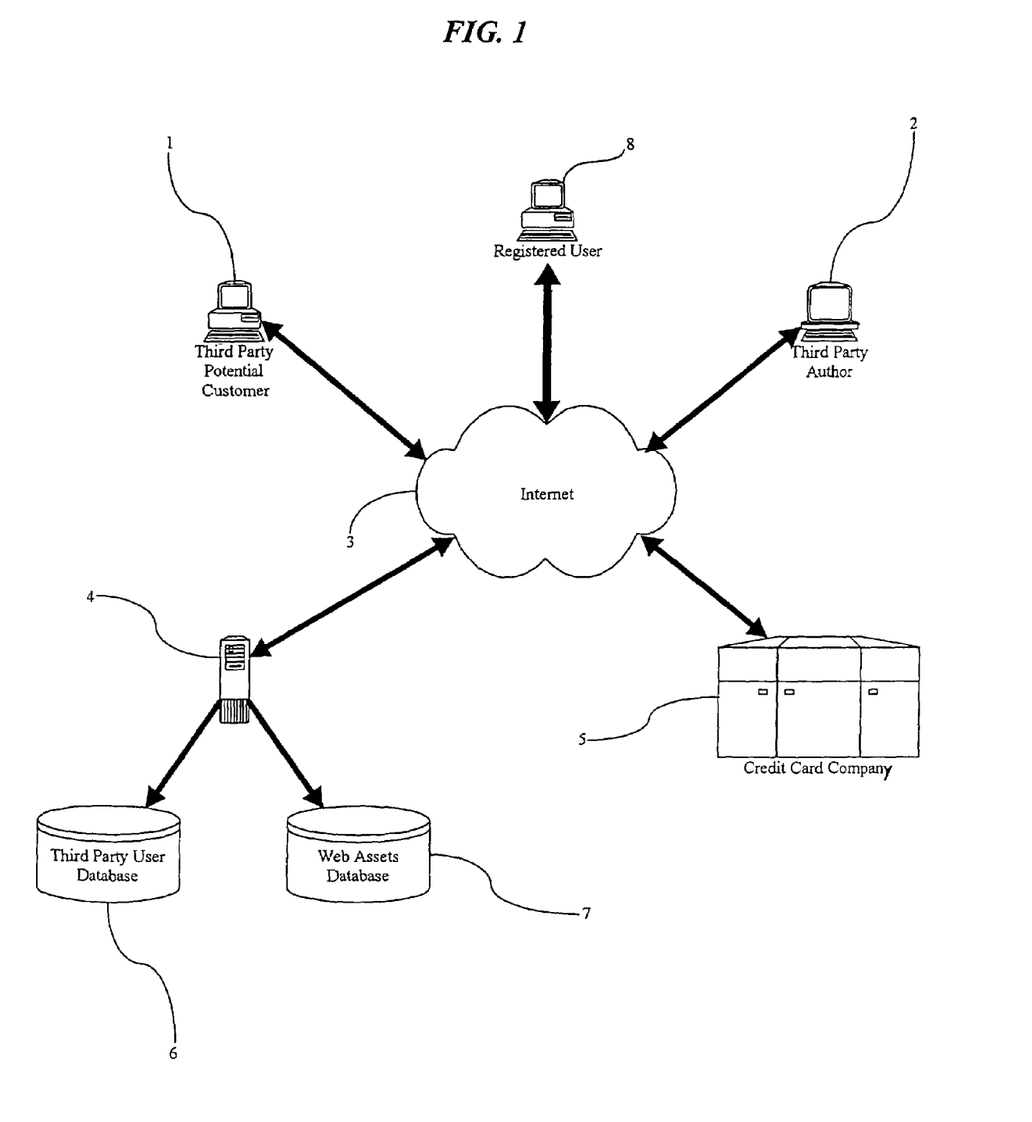
FIG. 1 illustrates a system in which the method of the present invention can be practiced.

FIG. 1 is a block diagram illustrating a system in which the method of the present invention can be practiced. Specifically, the preferred system includes a Web site authoring, development and distribution system 4. The system 4 is implemented on a server computer operably connected to the Internet 3 using standard techniques well-known in the art, for instance the TCP/IP protocol. The method preferably can be implemented on the server computer using standard computer programming techniques well-known in the art. As an example, the inventive method can preferably be implemented using the Java™ programming language distributed by Sun Microcomputer Corp. of Palo Alto, Calif.

Three types of third parties can interact with the system 4 through the Internet using standard Web-browsers, well-known in the art. First, registered users 8 who have submitted payment to the operator of the system 4 in exchange for full access to the system 4 can fully access the system 4. Second, third party potential customers 1 who have not submitted payment to the operator of system 4 in exchange for full access to the system 4 can receive limited access to the system 4. Finally, third party authors 2 who contribute Web assets for use in Web pages created by registered users 8 can access the system 4 for the limited purpose of uploading Web assets to the system 4 for distribution by the system 4.

System 4 preferably has a third party user database 6 and a Web assets database 7. The third party user database preferably includes a listing of all third party users registered to use the system 4. Specifically, registered users 8 are included in the third party user database 6. Moreover, third party user database 6 preferably includes a listing of third party authors 2 who have uploaded Web assets to the Web assets database 7 for distribution to the registered users 8 in the Web pages created by the registered users 8. Web assets database 7 preferably can store a catalog of Web assets uploaded by third party authors 2. Web assets database 7, however, is not limited to uploaded Web assets. Rather, Web assets database 7 can further include Web assets derived for other sources, for example Web assets created by the operator of the system 4.

The system 4 can automatically compensate a third party author 2 whose uploaded Web asset has been distributed to a registered user 8. When system 4 posts a Web page having a Web asset uploaded by a third party author 2 on behalf of a registered user 8, the system 4 can credit the credit card account of the third party author 2 in compensation for the use of the Web asset. Specifically, the system 4 can contact the credit card company 5 corresponding to the third party author's 2 credit card and can submit a credit over the Internet 3 to the credit card company 5.

Figure 2A:
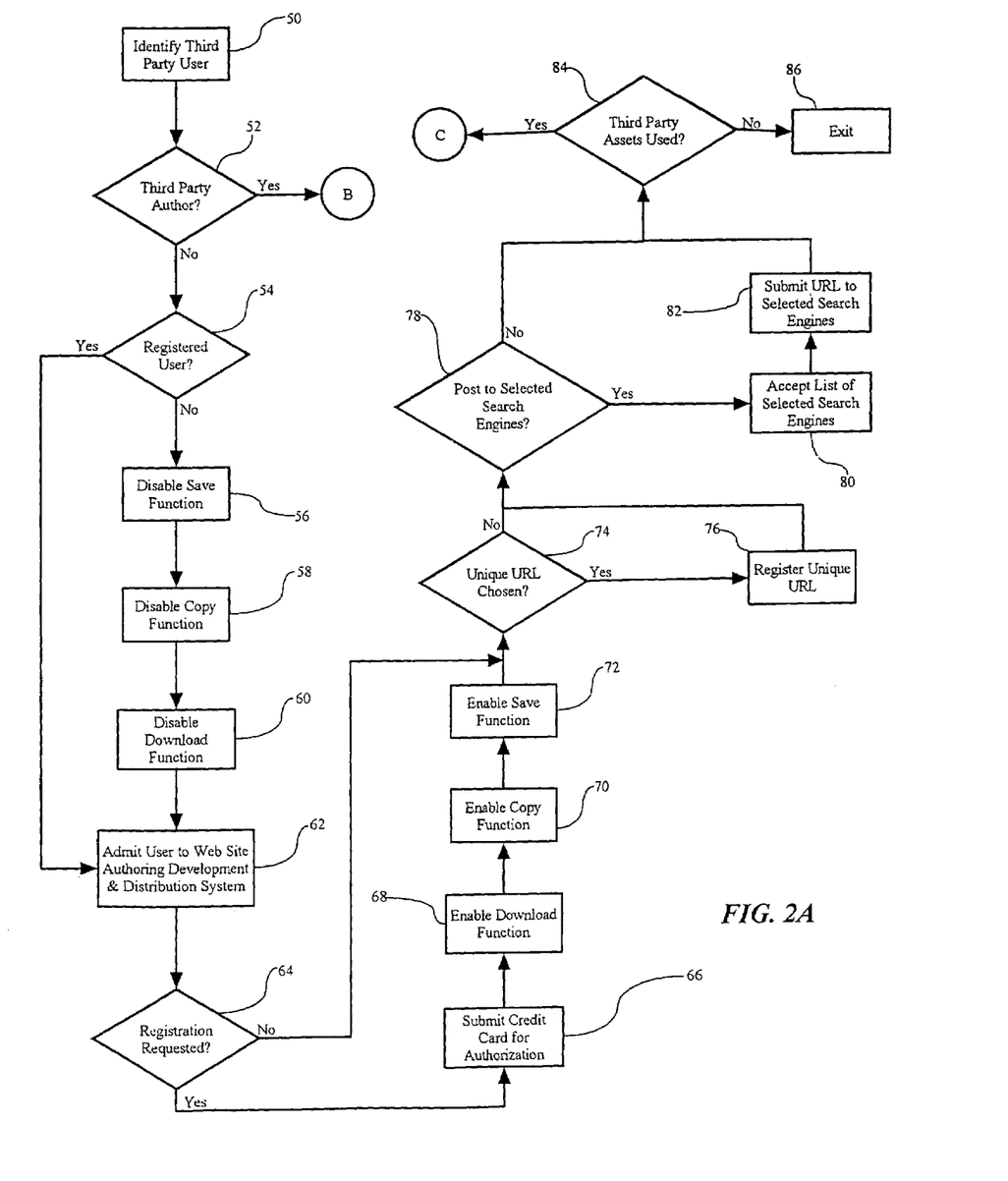
FIGS. 2A-2C, taken together, illustrate a flowchart of a method for moderating external access to an electronic document authoring, development and distribution system in accordance with a preferred embodiment of the present invention.
Figure 2B:
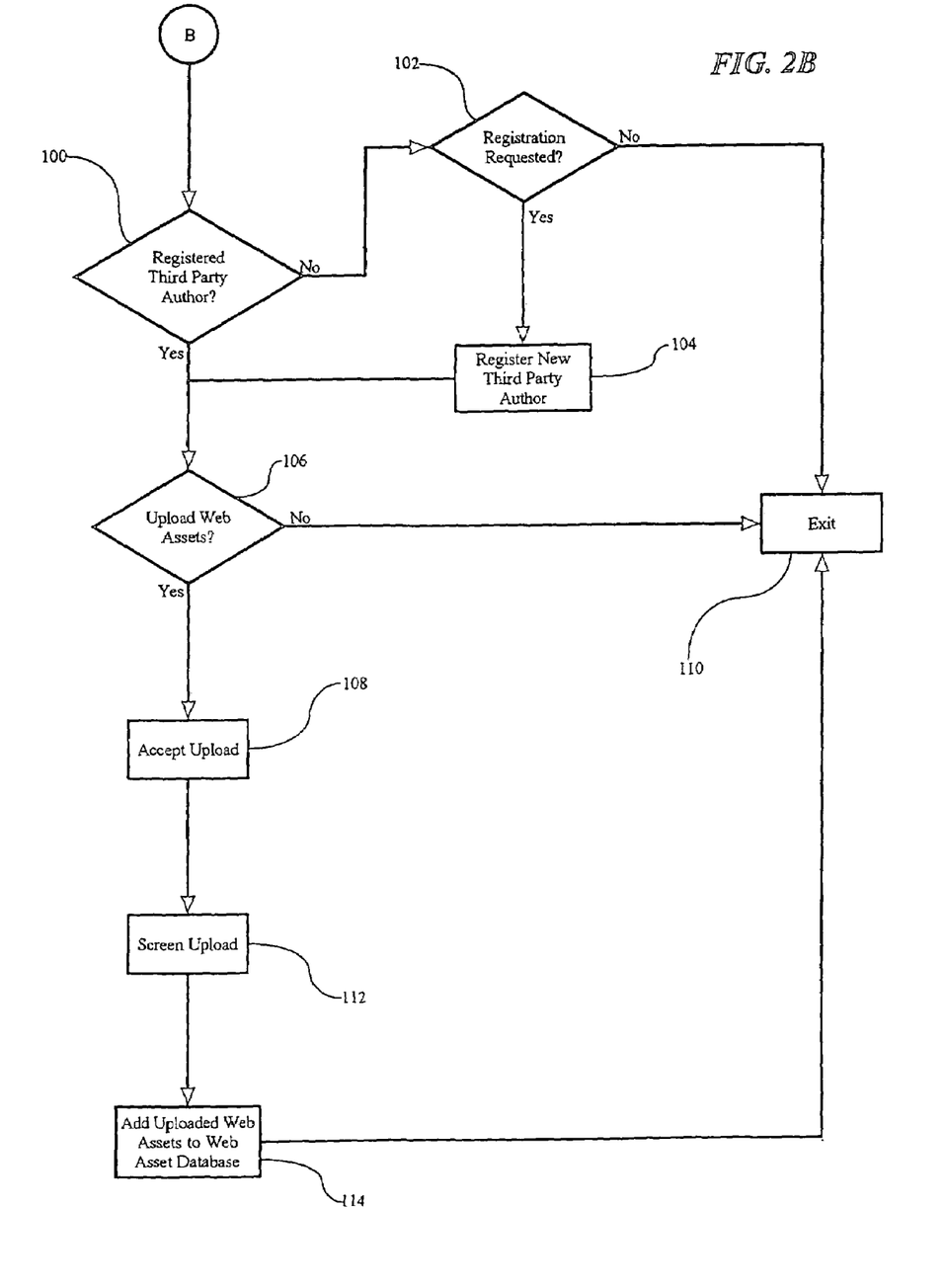
Figure 2C:
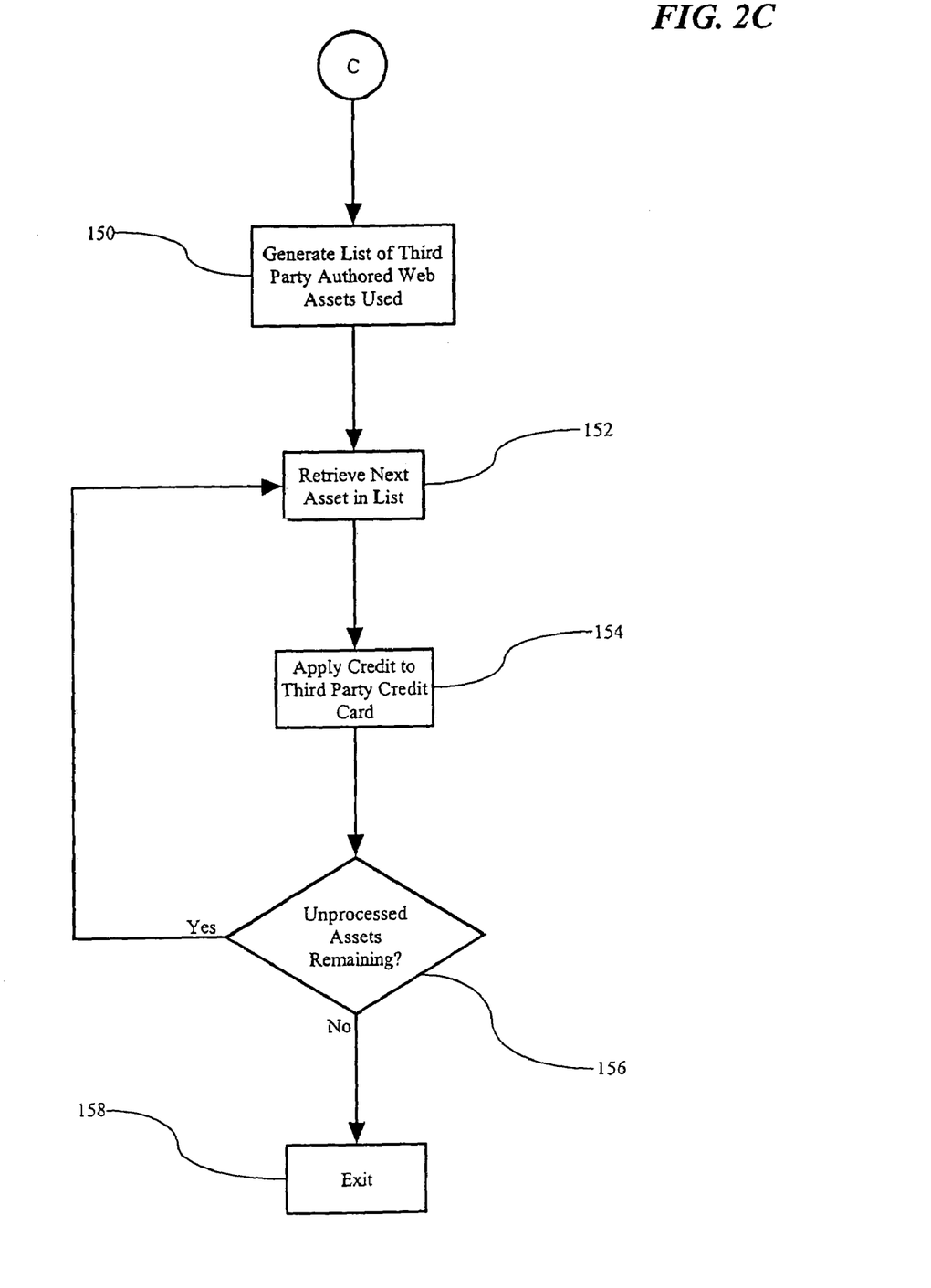

FIGS. 2A-2C, taken together, are a flowchart illustrating a method for moderating external access to the electronic document authoring, development and distribution system 4. In the preferred embodiment, the method can identify a request by a third party to access the system 4. If the third party is a third party a potential customer 1, the method can restrict the third party potential customer's 1 access to the saving, copying and downloading features of the system. Consequently, the third party potential user 1 can sample the functionality and utility of the system 4 without gaining full access to the system 4 before first paying an access fee for access rights to the system 4. In contrast, if the third party is a third party author 2 of a Web asset for use in a Web page designed by a registered user 8 using the system 4, the method permits the third party author 4 to upload the third party author's 2 contribution to the system's 4 Web asset database 7. Subsequently, if a registered user 8 of the system uses in the creation of a Web page the Web asset uploaded by the third party author 2, the system 4 can compensate the third party author 2 for the use of the Web asset contribution.

The inventive method begins in FIG. 2A in step 50 where system 4 identifies the third party user requesting access to the system 4. In decision step 52, if the third party user is a third party author 2, the system proceeds to jump circle B to further process the third party author's 2 request for access to the system 4. Alternatively, if in decision step 52, the identified third party user is not a third party author 2, the method further determines in decision step 54 whether the requesting third party user is a registered user 8, or a third party potential customer 1. If the identified third party user is a registered user 8, no restrictions are placed on the registered user's 8 access to the system 4 and the registered user 8, in step 62, is admitted to the system 4.

Conversely, if the identified third party user is a third party potential customer 1, restrictions are placed on the third party potential customer's 1 access to the system 4. Specifically, in step 56, the Save function preferably is disabled. Thus, although the third party potential customer 1 can create a Web page using the system 4, the third party potential customer 1 preferably cannot save an electronic copy of the Web page to permanent storage. Furthermore, in step 58, preferably the Copy function is disabled. Again, although the third party potential customer 1 can create a Web page using the system 4, the third party potential customer 1 preferably cannot create an electronic copy of the Web page. Finally, in step 60, preferably the Download function is disabled. As before, although the third party potential customer 1 can create a Web page using the system 4, the third party potential customer 1 preferably cannot download an electronic copy of the Web page. Thereafter, the third party potential customer 1 can be admitted to the system 4 in step 62.

Once admitted to the system 4 in step 62, the user, be it a registered user 8 or a third party potential customer 1, can utilize the system 4 to create a Web page. When finished creating a Web page, while accessing the system 4, a third party potential customer can choose to register with the system 4 as a registered user 8. Of course, an already registered user 8 would have no occasion to choose to register with the system 4. In decision step 64, if a request for registration is received, the system 4 preferably collects registration information, including credit card payment information, from the third party potential customer 1.

Subsequently, in step 66 the system 4 preferably can submit the credit card information to credit card company 5 for authorization. Once registered, in step 68 the disabled Download function can be enabled. Likewise, in step 70 the disabled Copy function can be enabled. Finally, the disabled Save function can be enabled. In this way, the former third party potential customer 1 preferably has been converted to a registered user 8.

In the preferred embodiment, a registered user 8 can choose a unique URL to be associated with the created Web page. If the system 4 identifies a registered user 8 option to choose a unique URL in decision step 74, system 4 preferably can register a unique domain name corresponding to the domain under which the created Web page can be stored. The domain name can be registered using known methods in the art. One such method can include querying a database of known domain names to determine the uniqueness of the chosen URL. Subsequently, system 4 can instruct a central administrator of Internet domain names to register the unique URL.

Also, in the preferred embodiment a registered user 8 can choose to post the URL corresponding to the Web page formed using the system 4 to a selection of URL search engines. If the system 4 identifies a registered user 8 option to post the URL to selected search engines in decision step 78, system 4 preferably can accept a list of selected search engines from the registered user 8 in step 80. Subsequently, the system 4 can post the URL to each selected search engine in step 82.

If a registered user 8 of the system uses in the creation of a Web page a Web asset uploaded by the third party author 2, the system 4 can compensate the third party author 2 for the use of the Web asset contribution. Thus, in accordance with the inventive method, in decision step 84, the system 4 preferably examines the created Web page for third party Web assets. In no Web assets attributable to a third party author 2 are identified in the Web page, the method preferably exits in step 86. In contrast, if system 4 identifies in the Web page at least one Web asset attributable to a third party author 2, the system 4 can compensate the third party author 2 along the path leading to jump circle C.

FIG. 2B illustrates a process for moderating a third party author's 2 access to the system 4. If, in decision step 52 of FIG. 2A, the system 4 identifies a third party user as a third party author 2, following the path from jump circle B to decision step 100, the system 4 first determines if the third party author 2 has previously registered with the system 4. In order to properly screen uploaded Web assets submitted by the third party author 2, the system 4 preferably can store registration information relating to the third party author 2. Moreover, in order to effectively compensate the third party author 2, the system preferably can store compensation information relating to the third party author 2. For example, preferably, the system 4 can store the third party author's 2 name, electronic mail address, mailing address and credit card number and expiration date. The third party author's 2 registration information preferably can be stored in the third party user database 6 and the Web assets database 7.

Consequently, in decision step 102, the third party author 2 can request to register with the system 4. If the third party author 2 declines registration, preferably, in step 110, the third party author 2 is denied access to the system 4. Conversely, if the third party author 2 requests registration in decision step 102, the system 4 can accept the registration of the third party author 2 in step 104. If, however, in decision step 100 the system 4 identifies the third party author 2 as having previously registered, the third party author 2 need not re-register. In any event, the third party author preferably can access the system 4 only to the extent necessary to register and upload Web assets. Thus, in decision step 106, if the third party author 2 attempts to access the system 4 for any other purpose, the method exits in step 110.

If, in decision step 106, the third party author 2 attempts to upload at least one Web asset, in step 108, the system 4 preferably can provisionally accept the third party author's 2 requested upload. Still, in order to ensure that the uploaded Web asset is appropriate content suitable for inclusion in a Web page generated by the system 4 on behalf of a registered user 8, in step 112, the system 4 preferably can screen each Web asset. Those Web assets deemed inappropriate by the system 4 for inclusion in the Web asset database 7 are discarded. In contrast, in step 114, those assets deemed suitable for inclusion in the Web asset database are added to the Web asset database prior to exiting in step 110. Correspondingly, the third party author 2 preferably can be compensated for the subsequent inclusion of the uploaded Web asset in a Web page generated by the system 4 on behalf of a registered user 8.

FIG. 2C illustrates the process for compensating a third party author 2 when the system 4 generates and posts a Web page having as part of its content a Web asset uploaded by the third party author 2. If, in decision step 84 of FIG. 2A, a third party-authored Web asset is identified in the Web page, following the path leading from jump circle C to step 150, the system 4 preferably can generate a list of third party-authored Web assets used in the Web page. Beginning with the first third party-authored Web asset, in step 152, the system 4 can retrieve from the Web assets database 7 and the third party user database 6, registration information corresponding to the third party author 2 of the Web asset. In step 154, a credit can be applied to the credit card corresponding to the third party author 2 using credit card information stored in the third party user database 6 and the Web assets database 7. Preferably, the system 4 can connect to the credit card company 5 through the Internet 3 to directly apply the credit owing to the third party author 2. In decision step 156, the system 4 can repeat the process if additional third party-authored Web assets contained in the Web page remain to be processed. If no third party-authored Web assets remain to be processed, the method can terminate in step 158.

In consequence, in the preferred embodiment, third party potential customers can "test-drive" the system 4 prior to paying for the use of the system 4. In addition, by restricting the potential customer's access to the system 4, the provider of the system 4 receives assurances that the third party potential customer cannot abuse the provider's good faith in providing free access to the third party potential customer. Moreover, the inventive method encourages third party authors 2 to contribute Web assets to the system 4 in exchange for compensation for Web assets used by the registered users 8. Hence, by virtue of the inventive method, registered users 8 of the system 4 receive a diverse selection of visual and functional components for inclusion in their Web pages. Thus, the inventive method can moderate external access to an electronic document authoring, development and distribution system.

The invention claimed is:

1. A method for moderating external access to an electronic document authoring, development and distribution system comprising the steps of:
   identifying a third party requesting access to said electronic document authoring, development and distribution system;
   permitting restricted access to said third party to selected functions of said electronic document authoring, development and distribution system; and,
   eliminating all access restrictions to said selected functions in said electronic document authoring, development and distribution system which were imposed in said permitting step when said third party registers as a registered user of said electronic document authoring, development and distribution system.

2. The method according to claim 1, wherein said permitting step comprises the steps of:
   first disabling in said system all document saving functionality;
   second disabling in said system all document copying functionality;

third disabling in said system all document downloading functionality; and, permitting access to said system subsequent to said first, second and third disabling steps.

3. The method according to claim 1, wherein said eliminating step comprises the steps of:

accepting payment from said third party;

recognizing said third party as a registered user; and, removing access restrictions to said system imposed on said registered third party by said permitting step.

4. The method according to claim 3, wherein said accepting step comprises the steps of:

accepting credit-card information from said third party;

submitting said credit card information to a corresponding credit card authorization system; and, retrieving payment authorization from said authorization system.

5. The method according to claim 3, wherein said removing step comprises the steps of:

first enabling in said system all document saving functionality;

second enabling in said system all document copying functionality;

third enabling in said system all document downloading functionality; and, permitting access to said system subsequent to said first, second and third enabling steps.

6. The method according to claim 3, further comprising the steps of:

accepting a request from said registered user for a unique URL;

registering said unique URL on behalf of said registered user; and, associating said unique URL with a Web site commissioned by said registered user and posted for Internet viewing said system.

7. The method according to claim 3, further comprising the steps of:

accepting a request from said registered user to submit a URL associated with a Web site commissioned by said registered user to a plurality of Web search engines;

retrieving a list of said Web search engines selected by said registered user; and, submitting said URL to each Web search engine contained in said list.

8. The method according to claim 1, further comprising the steps of:

accepting electronic submissions of Web assets from said third party;

storing said accepted Web assets in a Web asset database; and, compensating said third party for subsequent distribution of said Web assets.

9. The method according to claim 8, wherein said accepting step comprises the steps of:

permitting an upload of said Web assets from said third party;

screening said uploaded Web assets for marketable content; and, accepting said screened uploaded Web assets for distribution on said system.

10. The method according to claim 8, wherein said compensating step comprises the steps of:

for each Web asset used by a registered user in forming a Web page, identifying a third party author corresponding to said Web asset; and, crediting a credit card account of said third party author in compensation for said use by said registered user of said Web asset corresponding to said third party author.

11. A computer apparatus programmed with a routine set of instructions stored in a fixed medium, said apparatus comprising:

means for identifying a third party requesting access to an electronic document authoring, development and distribution system;

means for permitting restricted access to said third party to selected functions of said electronic document authoring, development and distribution system; and, means for eliminating all access restrictions to said selected functions in said electronic document authoring, development and distribution system which were imposed in said permitting step when said third party registers as a registered user of said electronic document authoring, development and distribution system.

12. The computer apparatus according to claim 11, wherein said permitting means comprises:

first means for disabling in said system all document saving functionality;

second means for disabling in said system all document copying functionality;

third means for disabling in said system all document downloading functionality; and, means for permitting access to said system subsequent to said first, second and third disabling by said first, second and third disabling means.

13. The computer apparatus according to claim 11, wherein said eliminating means comprises:

means for accepting payment from said third party;

means for recognizing said third party as a registered user; and, means for removing access restrictions to said system imposed on said registered third party by said permitting means.

14. The computer apparatus according to claim 13, wherein said accepting means comprises:

means for accepting credit card information from said third party;

means for submitting said credit card information to a corresponding credit card authorization system; and, means for retrieving payment authorization from said authorization system.

15. The computer apparatus according to claim 13, wherein said removing means comprises:

first means for enabling in said system all document saving functionality;

second means for enabling in said system all document copying functionality;

third means for enabling in said system all document downloading functionality; and, means for permitting access to said system subsequent to said first, second and third enabling by said first, second and third enabling means.

16. The computer apparatus according to claim 13, further comprising:

means for accepting a request from said registered user for a unique URL;

means for registering said unique URL on behalf of said registered user; and, means for associating said unique URL with a Web site commissioned by said registered user and posted for Internet viewing said system.

17. The computer apparatus according to claim 13, further comprising:

means for accepting a request from said registered user to submit a URL associated with a Web site commissioned by said registered user to a plurality of Web search engines;

means for retrieving a list of said Web search engines selected by said registered user; and, means for submitting said URL to each Web search engine contained in said list.

18. The computer apparatus according to claim 11, further comprising:

means for accepting electronic submissions of Web assets from said third party;

means for storing said accepted Web assets in a Web asset database; and, means for compensating said third party for subsequent distribution of said Web assets.

19. The computer apparatus according to claim 18, wherein said accepting means comprises:

means for permitting an upload of said Web assets from said third party;

means for screening said uploaded Web assets for marketable content; and, means for accepting said screened uploaded Web assets for distribution on said system.

20. The computer apparatus according to claim 18, wherein said compensating means comprises:

for each Web asset used by a registered user in forming a Web page, means for identifying a third party author corresponding to said Web asset; and, means for crediting a credit card account of said third party author in compensation for said use by said registered user of said Web asset corresponding to said third party author.

* * * * *